United States Patent
Doron et al.

(10) Patent No.: US 10,349,037 B2
(45) Date of Patent: Jul. 9, 2019

(54) STRUCTURED-STEREO IMAGING ASSEMBLY INCLUDING SEPARATE IMAGERS FOR DIFFERENT WAVELENGTHS

(71) Applicant: ams Sensors Singapore Pte. Ltd., Singapore (SG)

(72) Inventors: Moshe Doron, San Francisco, CA (US); Ohad Meitav, Sunnyvale, CA (US); Markus Rossi, Jona (CH); Dmitry Ryuma, San Francisco, CA (US); Alireza Yasan, San Jose, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 74 days.

(21) Appl. No.: 15/300,997

(22) PCT Filed: Mar. 31, 2015

(86) PCT No.: PCT/SG2015/050055
§ 371 (c)(1),
(2) Date: Sep. 30, 2016

(87) PCT Pub. No.: WO2015/152829
PCT Pub. Date: Oct. 8, 2015

(65) Prior Publication Data
US 2017/0034499 A1    Feb. 2, 2017

Related U.S. Application Data

(60) Provisional application No. 62/012,688, filed on Jun. 16, 2014, provisional application No. 61/974,640, filed on Apr. 3, 2014.

(51) Int. Cl.
*H04N 13/25* (2018.01)
*H04N 5/225* (2006.01)
(Continued)

(52) U.S. Cl.
CPC ............. *H04N 13/25* (2018.05); *G06T 7/521* (2017.01); *G06T 7/596* (2017.01); *H04N 5/2256* (2013.01);
(Continued)

(58) Field of Classification Search
CPC ................................. G01B 11/22; H04N 13/25
See application file for complete search history.

(56) References Cited

U.S. PATENT DOCUMENTS 6,377,700 B1   4/2002  Mack et al.
7,136,170 B2  11/2006  Notni et al.
(Continued)

FOREIGN PATENT DOCUMENTS

WO   2007/043036   4/2007
WO   2007/0105205  9/2007
(Continued)

OTHER PUBLICATIONS

Australian Patent Office (ISA/AU), International Search Report and Written Opinion issued for patent application PCT/SG2015/050055 (dated Aug. 4, 2015).

*Primary Examiner* — Rowina J Cattungal
(74) *Attorney, Agent, or Firm* — Fish & Richardson P.C.

(57) ABSTRACT

The present disclosure describes structured-stereo imaging assemblies including separate imagers for different wavelengths. The imaging assembly can include, for example, multiple imager sub-arrays, each of which includes a first imager to sense light of a first wavelength or range of wavelengths and a second imager to sense light of a different second wavelength or range of wavelengths. Images acquired from the imagers can be processed to obtain depth information and/or improved accuracy. Various techniques are described that can facilitate determining whether any of the imagers or sub-arrays are misaligned.

13 Claims, 18 Drawing Sheets

(51) Int. Cl.
*H04N 5/33* (2006.01)
*G06T 7/521* (2017.01)
*G06T 7/593* (2017.01)

(52) U.S. Cl.
CPC ... *H04N 5/332* (2013.01); *G06T 2207/10012* (2013.01); *G06T 2207/10048* (2013.01); *H04N 2213/003* (2013.01)

(56) References Cited

U.S. PATENT DOCUMENTS

| | | | |
|---|---|---|---|
| 7,330,593 B2 | 2/2008 | Hong et al. | |
| 7,433,024 B2 | 10/2008 | Garcia et al. | |
| 7,970,177 B2 | 6/2011 | St. Hillaire et al. | |
| 8,350,847 B2 | 1/2013 | Shpunt | |
| 8,456,517 B2 | 6/2013 | Spektor et al. | |
| 8,462,207 B2 | 6/2013 | Garcia et al. | |
| 8,493,496 B2 | 7/2013 | Freedman et al. | |
| 8,494,252 B2 | 7/2013 | Freedman et al. | |
| 2007/0102622 A1* | 5/2007 | Olsen | G02B 7/04 250/208.1 |
| 2008/0319704 A1 | 12/2008 | Forster | |
| 2009/0167843 A1 | 7/2009 | Izzat et al. | |
| 2009/0185274 A1 | 7/2009 | Shpunt | |
| 2010/0225746 A1 | 9/2010 | Shpunt | |
| 2010/0315490 A1 | 12/2010 | Kim et al. | |
| 2011/0025827 A1* | 2/2011 | Shpunt | G01B 11/22 348/46 |
| 2011/0096182 A1 | 4/2011 | Cohen et al. | |
| 2011/0164032 A1 | 7/2011 | Shadmi | |
| 2011/0175983 A1 | 7/2011 | Park et al. | |
| 2012/0056982 A1 | 3/2012 | Katz et al. | |
| 2012/0056988 A1 | 3/2012 | Stanhill et al. | |
| 2013/0095920 A1* | 4/2013 | Patiejunas | G06T 15/00 463/31 |
| 2014/0307057 A1* | 10/2014 | Kang | H04N 13/239 348/47 |

FOREIGN PATENT DOCUMENTS

| | | |
|---|---|---|
| WO | 2007/105215 | 9/2007 |
| WO | 2008/120217 | 10/2008 |

* cited by examiner

14B → DP2 (based on illumination from light projection unit)

STRUCTURED-STEREO IMAGING ASSEMBLY INCLUDING SEPARATE IMAGERS FOR DIFFERENT WAVELENGTHS

FIELD OF THE DISCLOSURE

The present disclosure relates to structured-stereo imaging assemblies including separate imagers for different wavelengths.

BACKGROUND

Various techniques can be used to produce three-dimensional (3D) images with a variety of lighting conditions and textures. For example, in a structured-light assembly, a pattern is projected onto a subject, an image of the pattern is obtained, the projected pattern is compared to the collected pattern, and differences between the two patterns are correlated with depth information. In other words, distortions in the pattern are correlated with depth. This technique can be useful for low-light and low-texture objects or scenes. In structured-light assemblies, the projected pattern often uses infra-red (IR) radiation. However, projected IR techniques cannot readily be used when ambient IR is high (e.g., outdoors). Further, the projected IR pattern typically cannot be projected over long distances, and the accuracy of the system tends to be highly sensitive to the accuracy of the projected pattern. This situation can arise, for example, when part of the pattern is occluded by a contour or feature of the object or scene being imaged.

Stereoscopic image capture is another technique for producing 3D depth information. Stereoscopic image capture requires two imagers spatially separated by a baseline distance (B). Depth information (Z) can be extracted from the measured disparity (D) between matched pixels in each image, and the focal length (F) of the imagers according to: $Z=(F \times B)/D$. Distinct features and/or intensity of the object or scene, such as texture, are required to facilitate matching pixels in both images. Consequently, stereoscopic pixel matching is particularly challenging for objects or scenes with low texture, or low-light scenes (where the observable features and intensity of textural differences are diminished). Often an object or scene may possess either high- and low-texture or high and low-light regions, where combinations of both stereoscopic and structured-light image capture are useful for generating depth information of the entire scene.

Structured-stereo (also referred to as active stereo) combines the benefits of both structured-light and stereoscopic image capture. In structured-stereo assemblies, a pattern is projected onto a subject, and images of the pattern are collected by two spatially separated imagers (e.g., IR imagers). Pattern capture by two (or more) imagers can eliminate the problems of pattern occlusion. Moreover, in low-texture and low-light scenes the projected pattern simulates the essential scene texture required for stereoscopic matching of pixels. The disparity between pixels is then correlated with depth. In some cases, disparities between collected patterns may be correlated with depth.

In addition, more advanced structured-stereo embodiments combine image projection (e.g., IR) and pattern-facilitated stereoscopic matching with additional stereoscopic image capture (e.g., RGB). Such an implementation is useful to gather depth information of a scene that is characterized by both low and high texture and/or low and high lighting features. Both structured-stereo and additional stereoscopic image capture are employed to correct the deficiencies of each method. Specifically, depth information from low-texture/low-light regions of a scene is combined with depth information from high-texture/high-light regions of a scene, where each is gathered by structured-stereo (e.g., IR) and additional stereoscopic image capture (e.g., RGB), respectively.

Some imaging assemblies that employ structured-light combinations or structured-stereo project an IR pattern and collect images with an IR/RGB color filter array (CFA), where RGB refers to red (R), green (G) and blue (B) light in the visible part of the spectrum, and where the IR and RGB sensitive regions of the imager are contiguous (i.e., part of the same mosaic or CFA). An imaging assembly that uses such a combined IR/RGB CFA can present various issues. First, crosstalk from the IR-pixels to RGB pixels of the imager can be significant, which can lead to images of reduced quality. Further, the combined IR/RGB CFA generally precludes incorporation of dedicated (e.g., wavelength-specific) optical elements such as lenses designed specifically for IR, red, green or blue light. Consequently, aberrations such as chromatic aberrations can be produced. In order to collect IR radiation, combined IR/RGB imagers typically do not have IR-cut filters. Consequently, RGB pixels may sense a lot of IR radiation, resulting in significant noise.

Another issue that can arise in spatially separated imaging imagers such as structured-stereo assemblies is misalignment. Misalignment is particularly detrimental to the accuracy of the collected depth information. Calibration of the imaging assembly typically occurs before reaching the end-user (e.g., before the assembly leaves the manufacturing factory). During normal use, however, the user may drop the imaging assembly, causing some of the imagers to become misaligned.

SUMMARY

The present disclosure describes structured-stereo imaging assemblies including separate imagers for different wavelengths.

For example, in one aspect, a structured-stereo imaging assembly includes multiple imager sub-arrays, each of which includes a first imager to sense light of a first wavelength or range of wavelengths and a second imager to sense light of a different second wavelength or range of wavelengths. Each of the imager sub-arrays can be mounted on a support.

Some implementations include one or more of the following features. For example, each imager sub-array can include an IR-sensitive imager and a RGB-sensitive imager. In some cases, the imaging assembly includes an array of more than two imager sub-arrays, each of which includes a combination of IR, UV, RGB and/or monochrome imagers. In some implementations, the imaging assembly includes one or more light projection units arranged to project an IR pattern onto a three-dimensional object. If there are multiple pattern projection units, they may have different optical characteristics from one another.

In some cases, one or more processors are operable, collectively, to obtain, from the imager sub-arrays, signals that collectively allow the processor to generate one or more of the following: (i) a stereo image based on images acquired from the first imagers, (ii) a stereo IR image based on images acquired from the second imagers, (iii) a stereo image based on images acquired in response to the light pattern projected by the pattern projection unit, or (iv) a non-stereo image based on images acquired in response to the light pattern projected by the pattern projection unit.

Imaging assemblies are described that have different combinations of imagers in the respective sub-arrays. For example, in some cases, the imaging assembly includes first, second and third imager sub-arrays, each of which includes a first imager to sense light of a first wavelength or range of wavelengths and a second imager to sense light of a different second wavelength or range of wavelengths. In some instances, the imaging assembly includes first and second imager sub-arrays, each of which includes a first RGB-sensitive imager, a second IR-sensitive imager and a third IR-sensitive imager, wherein the second and third IR-sensitive imagers are sensitive to different, respective portions of the IR spectrum. In some implementations, the imaging assembly includes first and second imager sub-arrays, each of which includes a first RGB-sensitive imager, a second RGB-sensitive imager, and a third IR-sensitive imager, wherein one of the first or second RGB-sensitive imagers includes a neutral density filter. One or more processors collectively can acquire images from different ones of the imagers in the sub-arrays and can process the acquired images, for example, to obtain improved depth information and/or improved accuracy.

In some instances, the techniques can includes matching images acquired from different sub-arrays (or groups of the sub-arrays), identifying disparities in pixel positions of the matched images, correlating the disparities with depth, and generating a depth map.

The disclosure also describes various techniques that can facilitate determining whether any of the imagers or sub-arrays are misaligned. For example, in one aspect, an imaging assembly includes multiple imager sub-arrays, each of which includes a first imager to sense light of a first wavelength or range of wavelengths and a second imager to sense light of a different second wavelength or range of wavelengths. One or more processors are configured, collectively, to obtain intra-array and inter-array information based on signals from the imager arrays, the information including intra-array depth information. The processor(s) can compare the intra-array depth information to inter-array depth information and determine whether one of the imager sub-arrays is misaligned based on the comparison.

Some implementations can achieve both structured and stereo benefits such as high-quality 3D imaging, even under low-light conditions, for low texture objects, and/or for images of objects where IR radiation is relatively high.

Other aspects, features and advantages will be apparent from the following detailed description, the accompanying drawings, and the claims.

DETAILED DESCRIPTION

Figure 1:
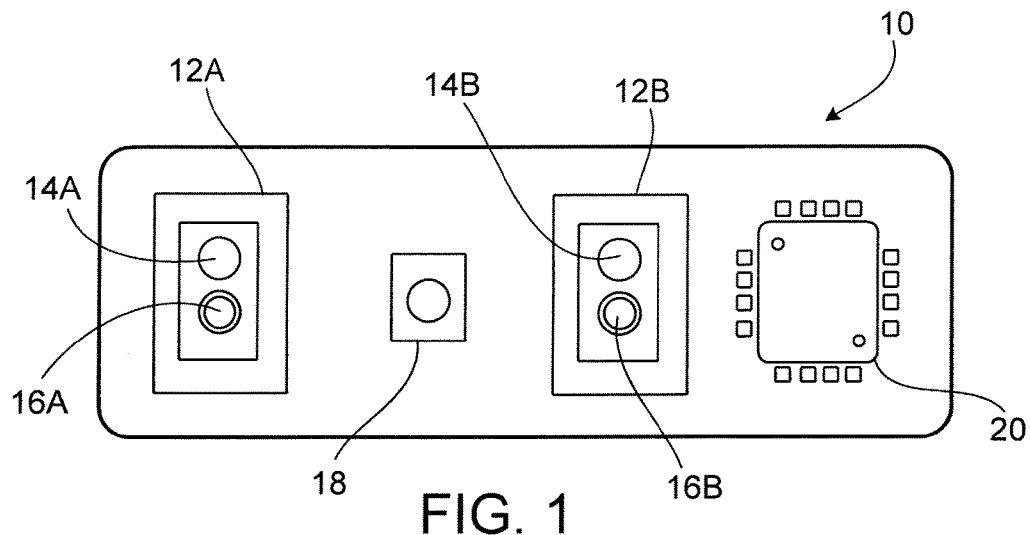
FIG. 1 illustrates an example of an imaging assembly.

As shown in FIG. 1, a combined structure and stereo imaging assembly 10 includes two or more imager sub-arrays 12A, 12B (sometime referred to collectively or individually by 12), each of which has at least two different types of imagers 14A, 16A or 14B, 16B. For example, a first type of imager 14A, 14B (sometime referred to collectively or individually by 14) may be an IR-sensitive imager and a second imager 16A, 16B (sometime referred to collectively or individually by 16) may be a visible light imager (e.g., a RGB imager). The IR-sensitive imager 14 may be an imager that is sensitive only to IR light or a clear imager that is sensitive to IR as well as RGB light. More generally, the different imagers 14, 16 in each sub-array 12 may be any combination of IR, UV, RGB or monochrome imagers. Although the example of FIG. 1 shows only two imager sub-arrays 12, some implementations may include additional imager sub-arrays. Likewise, although the example of FIG. 1 shows only a single IR imager 14 and a single RGB imager 16 in each imager sub-array 12, some implementations may include more than one IR imager and/or more than one RGB imager, or may include other types and combinations of imagers. Thus, in some cases, the assembly 10 can include an array of X sub-arrays (where X≥2), where each sub-array is an NxM sub-array of a particular combination of IR, UV, RGB and/or monochrome imagers (or other type of imager), where N≥1 and M≥2. The imagers 14, 16 can be implemented, for example, as solid-state sensors, such as charge-coupled devices (CCDs) or complementary metal-oxide semiconductor (CMOS) devices. The imagers 14, 16 detect light (e.g., visible, UV or IR) and generate electric signals corresponding to the detected light. The imager sub-arrays 12 can be mounted, for example, in a printed circuit board (PCB) or other support.

The IR-sensitive imager 14 and the RGB-sensitive imager 16 in a given imager sub-array 12 are separated spatially from one another (i.e., not contiguous) so as to reduce optical cross-talk and to reduce IR saturation of RGB pixels. As explained below, particular combinations of multiple-imager sub-arrays can be used for calibration. The placement of the sub-arrays 12 relative to each other, and the placement of the imagers 14, 16 (within each sub-array 12) relative to each other, is dictated generally by the fact that the placement (B, baseline) is limited by focal length (F), and pixel size. Each imager 14, 16 can have its own dedicated beam shaping element(s) (e.g., optical elements such as a lens stack disposed over the imager). Providing dedicated beam shaping elements can help reduce optical aberrations.

The imaging assembly 10 also includes a pattern projection unit 18 for projecting an IR or other optical pattern onto a 3D object. The pattern can be, for example, regular (e.g., grid) or irregular (e.g., speckles). The pattern projection unit 18 can include a light source and a pattern generator, and can be mounted on the same PCB as the imager sub-arrays 12. The pattern projection unit 18 can be positioned, for example, between a pair of imager sub-arrays 12. When an object is irradiated by light from the pattern projection unit 18, a light pattern appears on the surface of the object. If the pattern projection unit 18 generates IR radiation, then the light pattern may not be visible to the human eye. The projection distance should match the target system specification and system parameters. For proper functionality, the focal length (F) and baseline (B) values should be selected to fit the target depth resolution and maximum detection range. The illumination should be strong enough to achieve good signal-to noise ratio (SNR) and contrast when sensing the pattern. These characteristics generally can be a function of pixel sensitivity, field-of-view (FOV), and processing capability. Preferably, the pattern projection unit 18 can be altered dynamically (e.g., intensity can change as a function of the object or scene conditions).

Some implementations include multiple pattern projection units, where the projectors have different characteristics from one another. For example, in some implementations, a first unit can project a pattern configured for close objects, and another unit can project a pattern optimized for objects a further away. Some implementations include pattern projection units configured to illuminate different regions of the scene such that, collectively, the projection units cover the entire scene. Some instances include multiple units, each of which projects a pattern using one or more wavelengths of light that differ from the other units. For example, the projection units can have different wavelengths/frequencies, where there are corresponding sensing channels with band-pass filters with similar frequency responses. An advantage of this arrangement is that the combined depth maps generated from multiple frequencies can increase the lateral resolution of the final depth map.

Figure 1A:
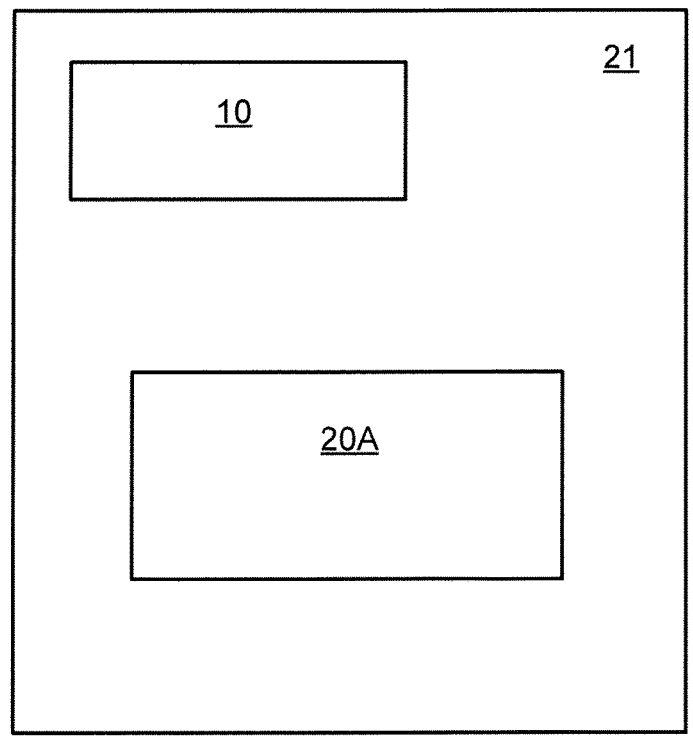
FIG. 1A illustrates an example of a host device into which the imaging assembly is integrated.

Depending on the implementation, one or more processors can be associated with the imaging assembly 10. Collectively, the processors handle image processing and stereo-matching. In some cases, the imaging assembly 10 may include a dedicated processor 20, which can be implemented, for example, as an integrated circuit semiconductor chip with appropriate logic and other circuitry. The processor 20 also can be mounted, in some cases, on the same PCB as the imager sub-arrays 12. In some implementations, the dedicated processor 20 performs both image processing and stereo-matching. In other implementations, the processor 20 processes and stiches the images, but stereo-matching is performed by a processor 20A external to the imaging assembly 10. Such situations can be useful, for example, where the imaging assembly 10 is integrated into an electronic notebook or other host device 21 that has its own processor 20A (see FIG. 1A). In yet other implementations, both image processing and stereo-matching may be performed by a host processor 20A external to the imaging assembly 10. Such situations can be useful, for example, where the imaging assembly 10 is integrated into a mobile phone or other host device 21 that has its own processor 20A. In such cases, the imaging assembly 10 may not need to include its own dedicated processor 20. In the various examples below, reference is made to the processor 20. However, it should be understood that any one of the foregoing scenarios can be used in examples discussed below, depending on the implementation.

The processor 20 is configured to control illumination of an object by the pattern projection unit 18, acquire signals generated by the imagers 14, 16 of the imager sub-arrays 12, and to process the acquired signals. In some implementations, the output from the sub-arrays 12 is a standard Bayer pattern or clear/IR monochromatic pattern. A processing chip having two standard sensor inputs (e.g., MIPI/parallel) can be used.

Figure 2:
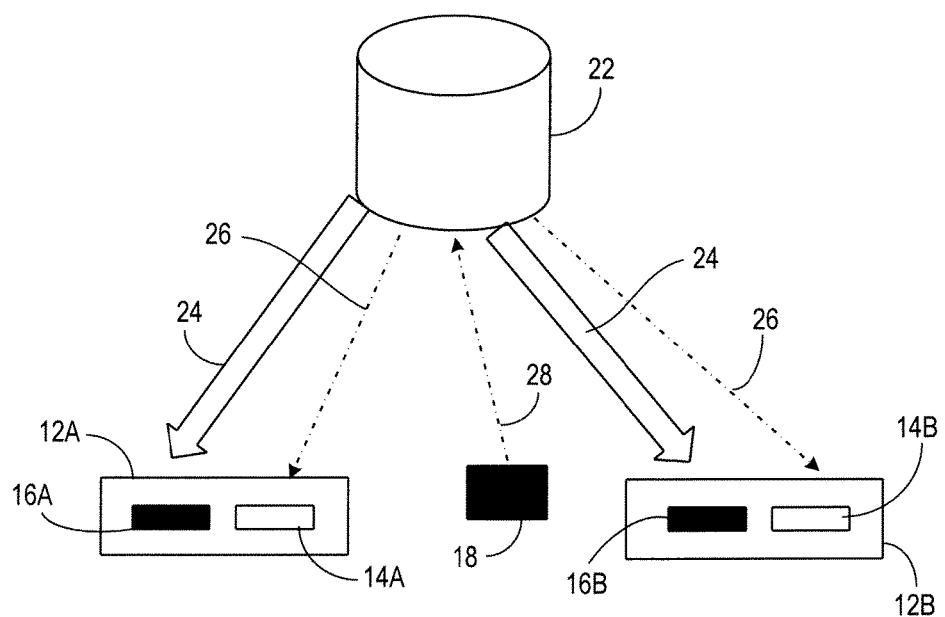
FIG. 2 illustrates the detection of images of an object by the imaging assembly.

As illustrated by FIG. 2, the RGB imagers 16 can sense light 24 in the visible part of the spectrum that is reflected, for example, by a 3D object 22. The object 22 may be a single 3D object or a scene that includes multiple objects. In some cases, the imaging assembly 10 can be used to sense and recognize hand gestures or facial expressions used as input to an electronic device. The visible light impinging on the object 22 may come, for example, from an external source. Likewise, the IR imagers 14 can sense IR radiation 26 that is reflected by the object 22. If the pattern projecting unit 18 is used to project an IR pattern 28 onto the object, some of the IR radiation detected by the IR imagers 14 can include IR radiation generated by the unit 18 and subsequently reflected by the object 22. Thus, the IR light impinging on the object 22 may come from the pattern projection unit 18.

Figure 3:
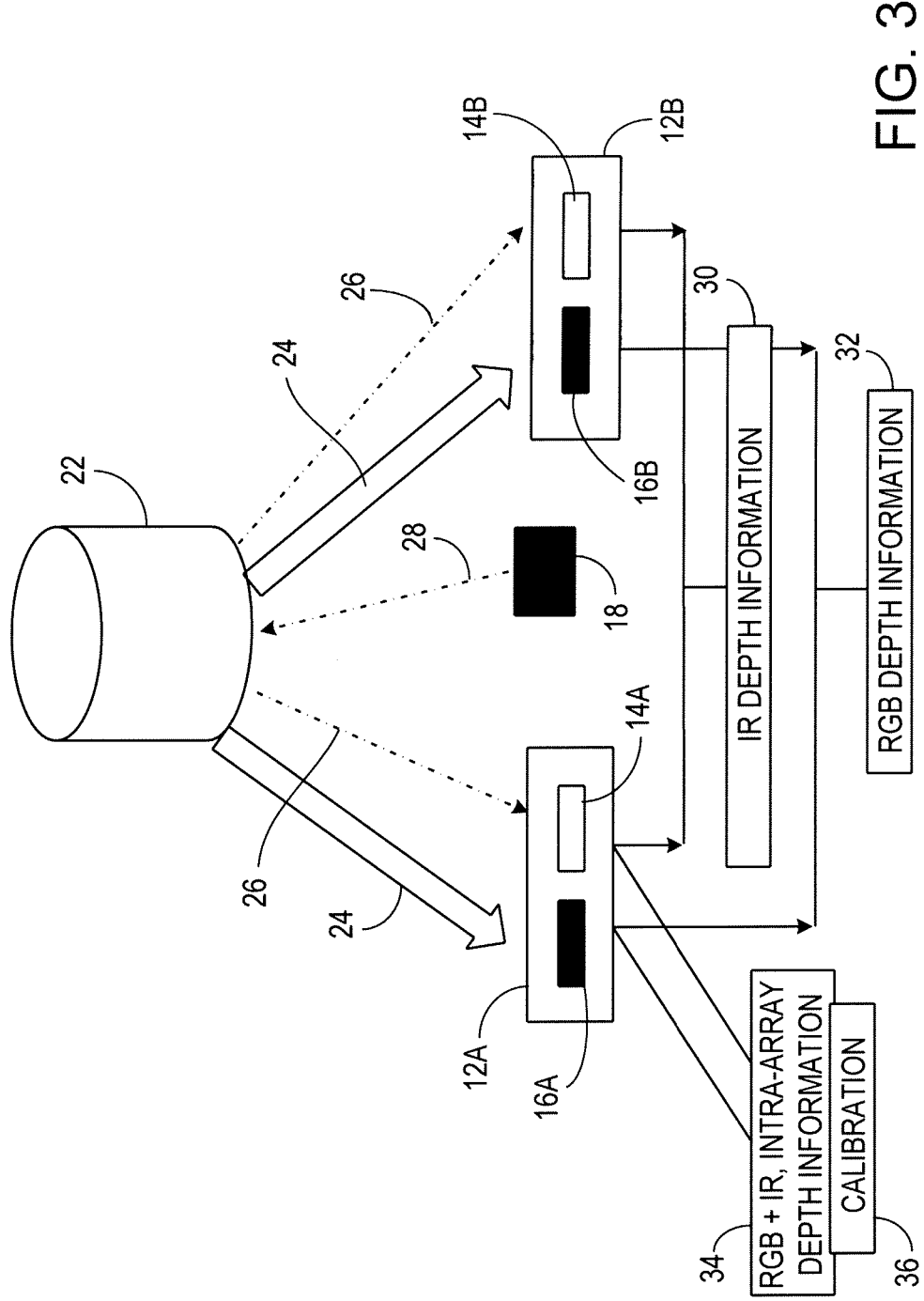
FIG. 3 illustrates various processing capabilities of the imaging assembly.

Collectively, the imager sub-arrays 12 can generate depth information from stereoscopically matched RGB images, and depth information from stereoscopically matched IR images of the IR pattern projected by the unit 18. For example, by using the signals from the RGB imagers 16 in two or more sub-arrays 12, the processor 20 can generate a stereo RGB image of the object 22 by matching corresponding pixels in each image based on the detected visible light. As indicated by FIG. 3, the signals from the RGB imagers 16 can be used to obtain depth information 32 by correlating the disparity in matched pixels with depth (where distinct features in the scene (namely texture) facilitate the stereoscopic matching of pixels). In this context, depth information indicates the distance to an object (e.g., the object 22). Similarly, by using the signals from the IR imagers 14 in two or more arrays sub-12, the processor 20 can generate depth information 30 by correlating the disparity in matched pixels with depth (where the projected pattern facilitates the stereoscopic matching of pixels). As indicated by FIG. 3, the signals from the IR imagers 14 can be combined with RGB depth information 32 to provide comprehensive depth information of the object or scene corresponding to both high- and low-texture/lighting regions of the scene. The processor 20 can acquire and process intra-array information 34 as well as inter-array information (where the former comprises stereoscopically matching pixels from the RGB and IR imagers on the same sub-array) and correlates their respective disparity with depth (when feature points in the object or scene are visible to both RGB and IR-sensitive imagers). This intra-array derived depth information may be used in combination with inter-array derived depth information to determine, and correct for, misalignment between sub-arrays.

For example, signals from two or more of the IR-sensitive imagers 14 on different sub-arrays 12 can be used by the processor 20 to generate depth information 30 based on the IR images acquired by the imagers (inter-array depth information) 14. Further the signals from imagers on the same sub-array (e.g., imagers 16A and 14A, or imagers 16B and 14B) can generate depth information 34 that, when compared to inter-array depth information 30 or 32 (e.g., imagers 16A and 16B, or imagers 14A and 14B), can be used for inter-array calibration (i.e., to correct for misalignment between imager sub-arrays when an entire sub-array is misaligned with respect to the other). In addition, the signal(s) from a single one of the IR imagers 14 can be used to generate depth information when the IR image of the projected pattern is compared to known patterns. Such a non-stereo image can be used, for example, for intra-array calibration 36, as described below.

In general, the processor 20 in the imaging assembly 10 can obtain inter-array and/or intra-array depth information using the various imagers 14, 16 in the sub-arrays 12. The depth information can be used, for example, to generate a depth map, which then may be used to generate a 3D image. Specific examples are described below.

Figure 4:
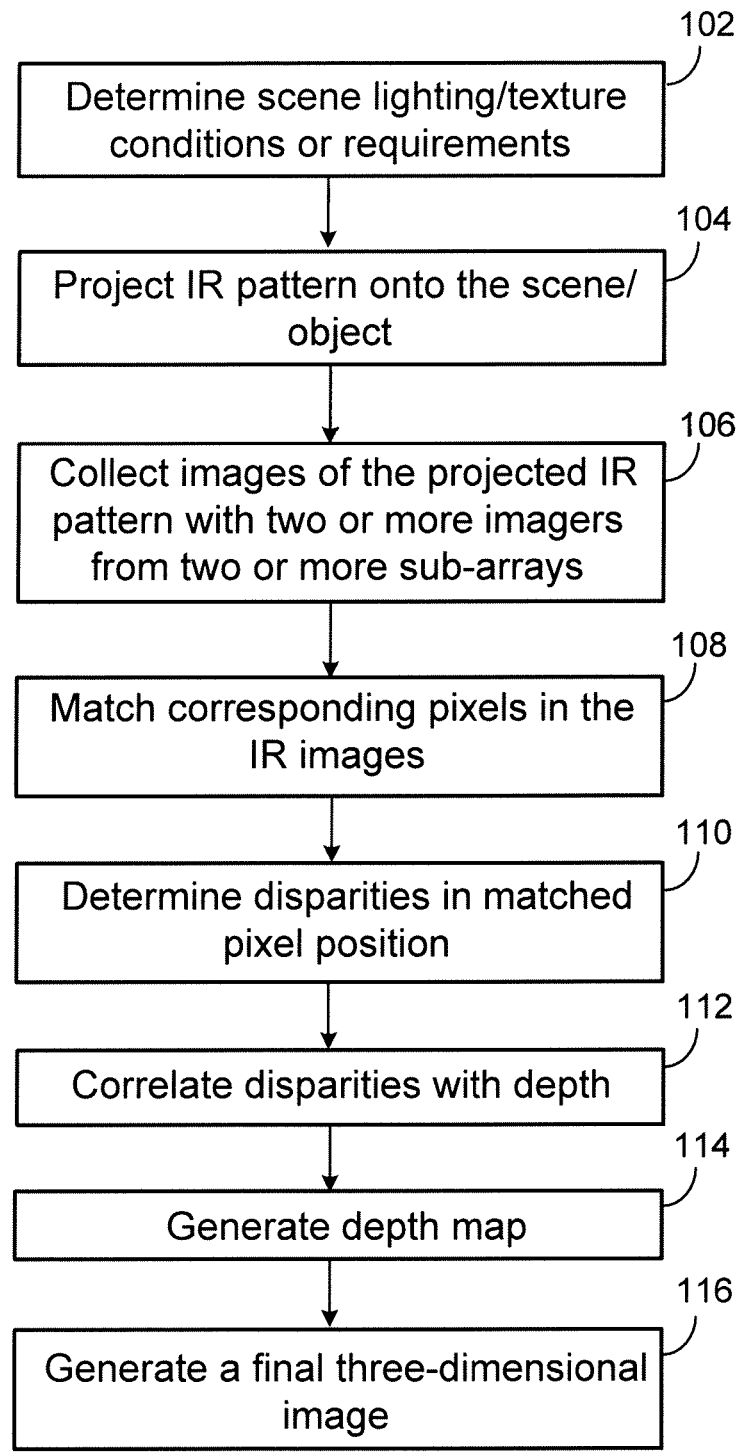
FIG. 4 is a flow chart according to a first implementation.

A first example is described in connection with FIG. 4. This scenario can be suitable, for example, in a low-light, low-texture scene where only the structured light (i.e., the IR projected pattern and IR stereo image collection of the pattern) provides useful depth information. Various steps can be performed, at least in part, by the processor 20. The process includes determining scene lighting/texture conditions or requirements (block 102). An IR pattern is projected onto the scene or object (e.g., object 22) (block 104). Images of the projected IR pattern and two or more clear imagers from two or more sub-arrays 12 are acquired (block 106). The processor 20 then matches corresponding pixels in the IR images (block 108). The matching pixels can be identified, for example, by the projected-pattern features. The processor 20 identifies disparities in the matched pixel position (block 110) and correlates any such disparities with depth (block 112) (e.g., using the formula Z=(F×B)/D). The processor 20 can generate a depth map (block 114) and, in some cases, may generate a final 3D image (block 116). In some cases, differences in color in the depth map can correspond to different depths. In this example, the clear channels sense only the luma value of each pixel, and the output image is a gray-scale image.

Figure 5:
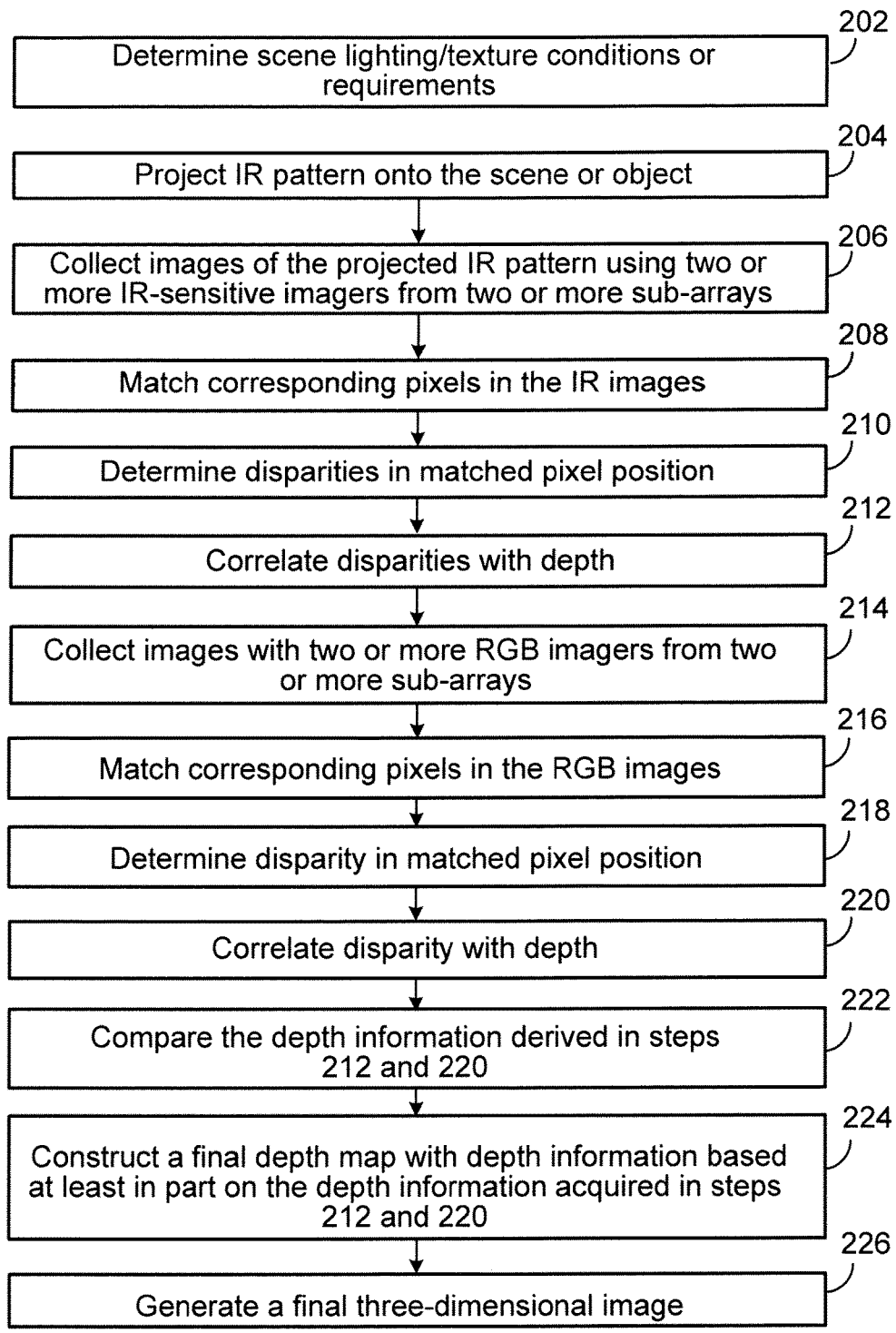
FIG. 5 is a flow chart according to a second implementation.

A second example is described on connection with FIG. 5. This scenario can be suitable, for example, where both low and high texture/lighting are present, thus necessitating a projected IR pattern, IR stereo image collection of the projected pattern, and RGB stereo image collection. Various steps can be performed, at least in part, by the processor 20. The process includes determining the scene lighting/texture conditions or requirements (block 202). An IR pattern is projected onto the scene or object (block 204). Images of the projected IR pattern using two or more IR-sensitive imagers are acquired from two or more sub-arrays 12 (block 206). The processor 20 then matches corresponding pixels in the IR images (block 208). The matching pixels can be identified, for example, by the projected-pattern features. The processor 20 then identifies disparities in the matched pixel position (block 210) and correlates the disparities with depth (block 212).

The processor 20 also acquires images with two or more RGB imagers from two or more sub-arrays 12 (block 214) and matches corresponding pixels in the RGB images, for example, based on native features (block 216). The processor 20 then identifies disparities in the matched pixel position (block 218) and correlates the disparities with depth (block 220). In some cases, blocks 214 through 220 are performed in parallel with blocks 204 through 212.

As indicated by blocks 222 and 224, the processor compares the depth information derived in blocks 212 and 220, and determines to which regions in the image the respective depth information should be applied. The determination of block 224 can be based, for example, on statistics. For example, a first part of the scene may not have enough native features to derive good depth information and thus the depth information derived in block 212 may be used to represent the first part of the scene in the final depth image. On the other hand, a second part of the scene may have sufficient texture so that depth information derived in bock 220 may be used to represent the second part of the scene in the final depth map. The processor 20 then constructs a final depth map including depth information, derived at least in part from the depth information of obtained in blocks 212 and 220 such that each region in a scene (of low or high texture, lighting) is accurately mapped (block 224). In some cases, the processor 20 then may generate a final 3D image (block 226). In some cases, differences in color in the depth map can correspond to different depths.

Figure 6:
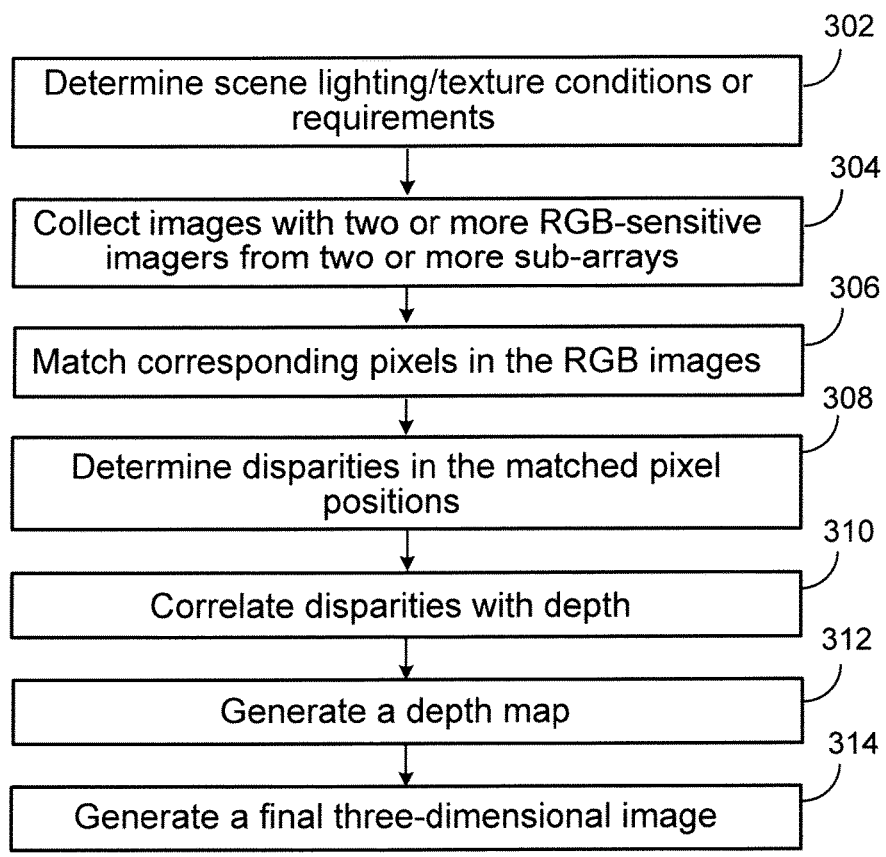
FIG. 6 is a flow chart according to a third implementation.

A third example is illustrated in FIG. 6 and is suitable, for example, for scenarios in which there is sufficient lighting and texture in the scene such that only RGB stereo image collection is needed. Various steps can be performed, at least in part, by the processor 20. As in the previous examples, scene lighting/texture conditions or requirements are determined (block 302). Images are acquired using two or more RGB-sensitive imagers 16 from two or more sub-arrays 12 (block 304). The processor 20 then matches corresponding pixels in the RGB images, for example, by identifying pixels using native features (block 306). Next, the processor 20 identifies disparities in the matched pixel position (block 308) and correlates the disparities with depth (block 310). The processor then can generate a depth map (block 312) and may generate a final 3D image (block 314). In some cases, differences in color in the depth map can correspond to different depths.

Figure 7:
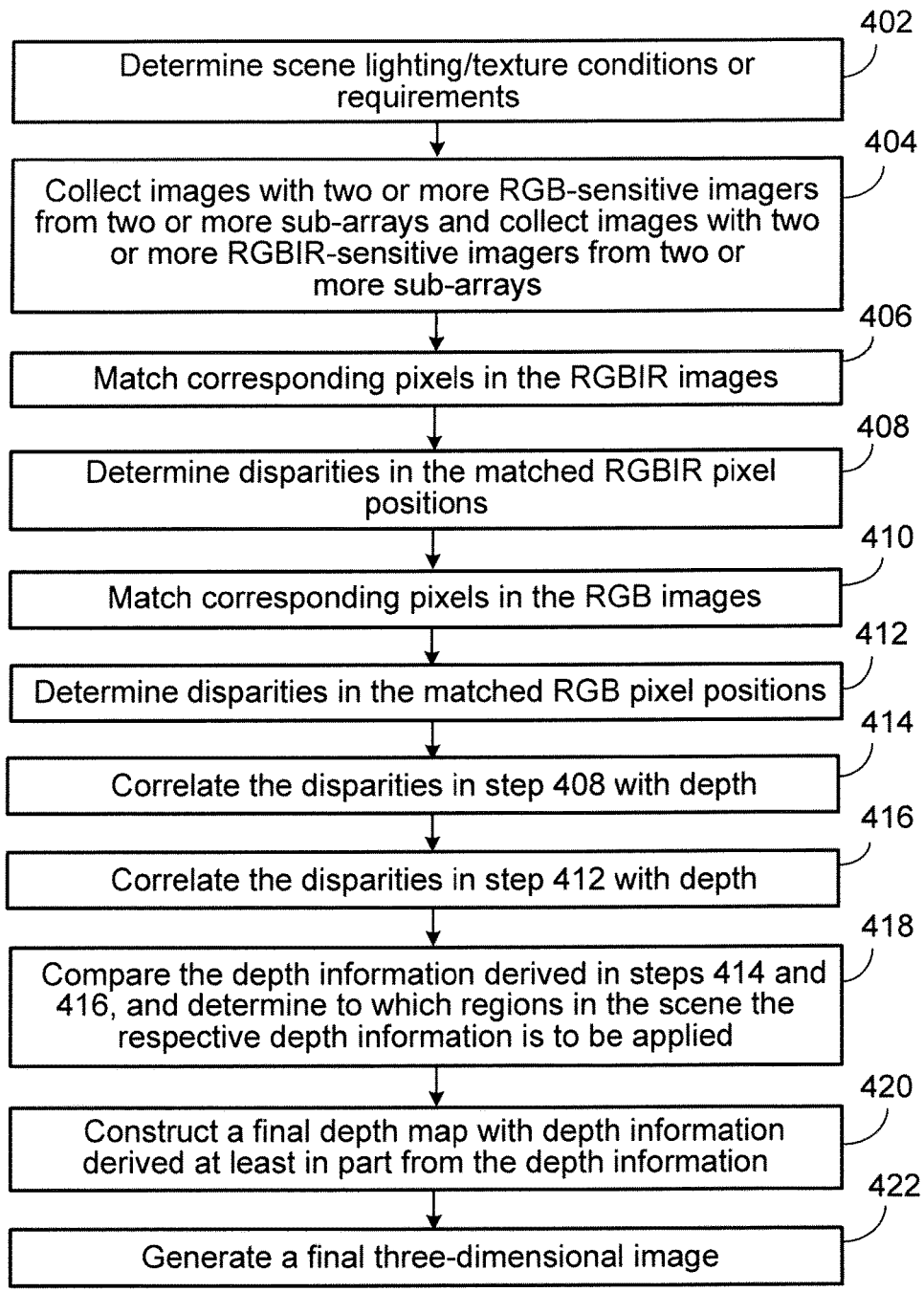
FIG. 7 is a flow chart according to a fourth implementation.

FIG. 7 illustrates a fourth example, which can be useful, for example, for scenarios under low-light and large distance scene conditions. Various steps can be performed, at least in part, by the processor 20. As in the previous example, the scene lighting/texture conditions or requirements are determined (block 402). Images are acquired from two or more RGB-sensitive imagers in two or more sub-arrays 12 and images are acquired from two or more RGBIR-sensitive imagers in two or more sub-arrays 12 (block 404). The processor 20 then matches corresponding pixels in the RGBIR images, for example, by identifying pixels using native features (block 406) and identifies disparities in the matched RGBIR pixel position (block 408). The processor 20 also matches the corresponding pixels in the RGB images, for example, by identifying pixels using native features (block 410) and identifies disparities in the matched RGB pixel position (block 412). In some implementations, the matching that takes place at blocks 410 and 406 may be performed in parallel (i.e., at the same time). Likewise, identifying the disparities in blocks 408 and 412 may occur in parallel in some cases. Next, the processor 20 correlates the disparities identified at block 408 with depth (block 414) and correlates the disparities identified at block 412 with depth (block 416).

As further indicated by FIG. 7, the processor 20 compares depth information derived at blocks 414 and 416, and determines to which regions in the scene the respective depth information is to be applied. The determination of block 418 can be based, for example, on statistics. In some implementations, a first part of the image may have native features sufficient to derive depth information such that depth information from block derived at block 416 can be used to represent the first part of the image in the final depth map. On the other hand, a second part of the image may have additional useful depth information in RGBIR, so that depth information derived from at block 414 may be used to represent the second part of the image in the final depth map. As indicated by block 420, the processor 20 then constructs a final depth map including depth information derived at least in part from the depth information of blocks 414, 416 such that each region in a scene (e.g., of low or high texture, lighting) is accurately mapped. In some cases, differences in color in the depth map can correspond to different depths. The processor 20 also may generate a final 3D image (block 422).

Intra-array depth information, in combination with inter-array depth information, also can be used to calibrate of the imaging assembly 10. The intra-array imager distance and orientation can be assumed to be fixed. Thus, the distance between the IR and RGB imagers 14, 16 on the same sub-array 12, as well as their relative orientation, can be assumed to remain the same. As the IR and RGB imagers 14, 16 on a given sub-array 12 are spatially separated from one another, images acquired by the two imagers can be used by the processor 20 to derive depth information. Inter-array depth information can be obtained as well. The processor 20 then can compare intra-array and inter-array depth information and determine whether one of the arrays is misaligned. In some cases, one of the sub-arrays (e.g., sub-array 12B) may be misaligned or one or more of the imagers (e.g., imager 14B or 16B) in a particular sub-array may be misaligned (e.g., as a result of the imaging assembly 10 being dropped and hitting a hard surface). If the processor 20 identifies a disparity between the intra- and inter-array depth information, the difference can be used, for example, to correct for the misalignment. Such corrections can be used for automated inter-array calibration of the imaging assembly 10 either at the factory (i.e., during the manufacturing and production process) and/or by a consumer or other user at a later time. Specific calibration examples are described below.

Figure 8:
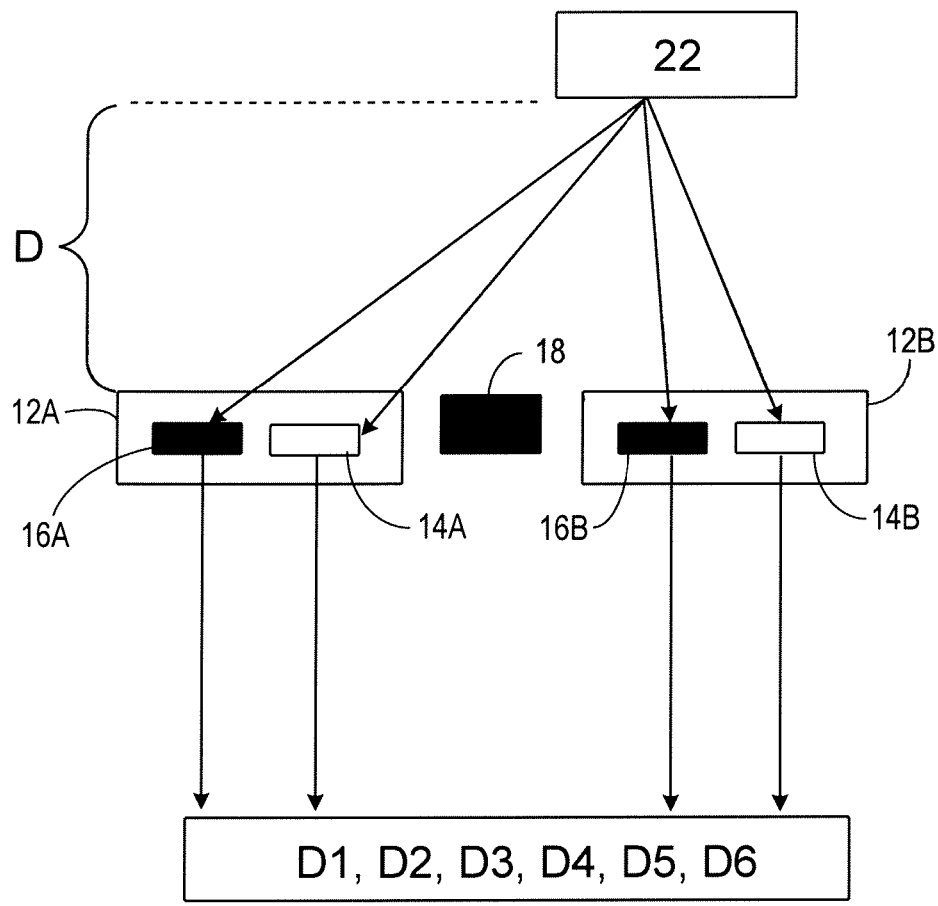
FIG. 8 illustrates a first calibration example.

A first calibration example is illustrated in FIG. 8 which shows two sub-arrays 12A, 12B that are properly aligned. In this example, the processor 20 acquires pairs of images from different combinations of the imagers 14A, 14B, 16A, 16B in each of the sub-arrays 12A, 12B. Known stereo-matching techniques can be used to determine respective distance values from the imagers to the object 22. For a 2(2×1) assembly as shown in FIG. 8, a respective distance value (D1, D2, D3, D4, D5 or D6) is obtained for each of six imager pairs (i.e., 14A and 16A; 14B and 16B; 14A and 14B; 14A and 16B; 16A and 14B; 16A and 16B). In this case, there are six distance values that are obtained. The processor 20 can compare the distance values to one another so as to identify any imagers that may be misaligned. In the illustrated example, it is assumed that the processor 20 determines that all six distance values (D1, D2, D3, D4, D5, D6) equal the same value, indicating that the imagers are properly aligned and that no further calibration is needed.

Figure 9:
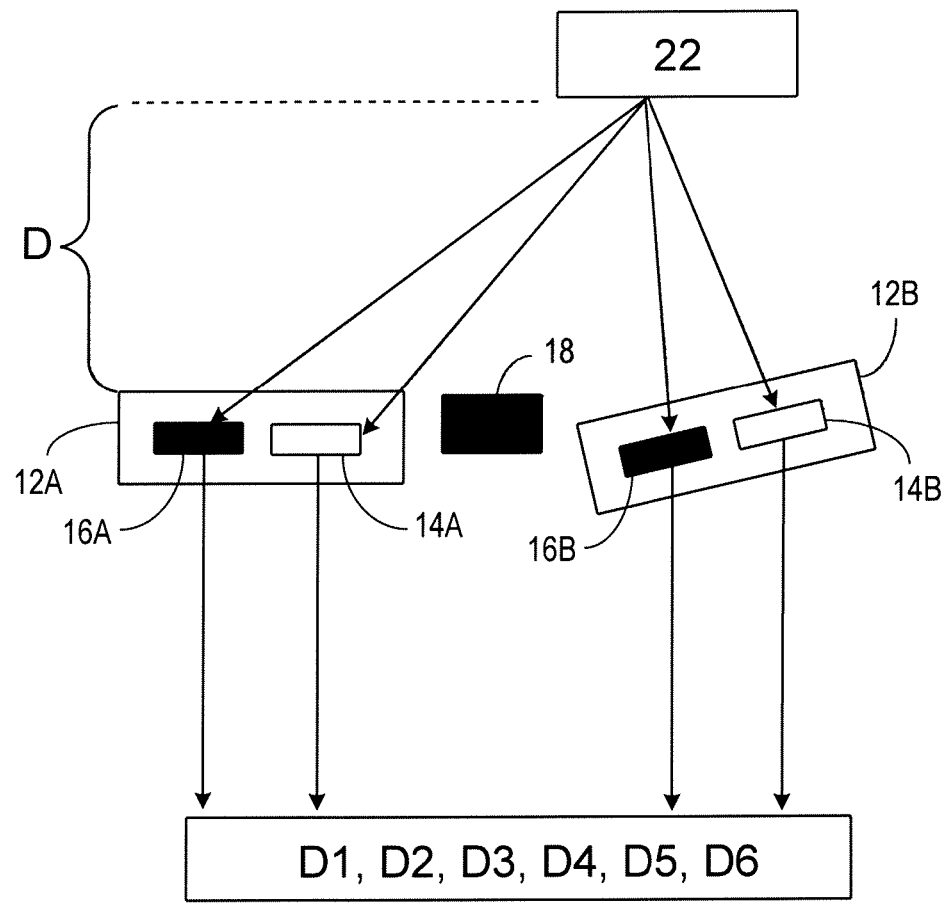
FIG. 9 illustrates a second calibration example.

FIG. 9 illustrates a second calibration example, which shows that one of the sub-arrays 12B is misaligned, but that the imagers 14B and 16B on the misaligned sub-array are not misaligned with respect to one another. As in the previous example, the processor 20 can use known stereo-matching techniques used to determine respective distance values from the imagers to the object 22. Thus, a respective distance value (D1, D2, D3, D4, D5 or D6) is obtained for each of six imager pairs (i.e., 14A and 16A; 14B and 16B; 14A and 14B; 14A and 16B; 16A and 14B; 16A and 16B), and the distance values are compared so as to identify any imagers that may be misaligned. In this example, it is assumed that the processor 20 determines that each of the distance values D1 and D2 (corresponding, respectively, to the imager pairs 14A, 16A and 14B, 16B) equals a first value (D) and that each of the remaining distance values (D3, D4, D5, D6) equals a different value (d). Based on these distance values, the processor 20 determines that an inter-array misalignment has occurred (i.e., an entire sub-array 12A or 12B is misaligned), and that the intra-array distances D1=D2=D represent the accurate distance to the object 22. The processor 20 then can apply correction factors such that the other distance values (D3 through D6) effectively become equal to D as well, thereby correcting for the misalignment.

Figure 10:
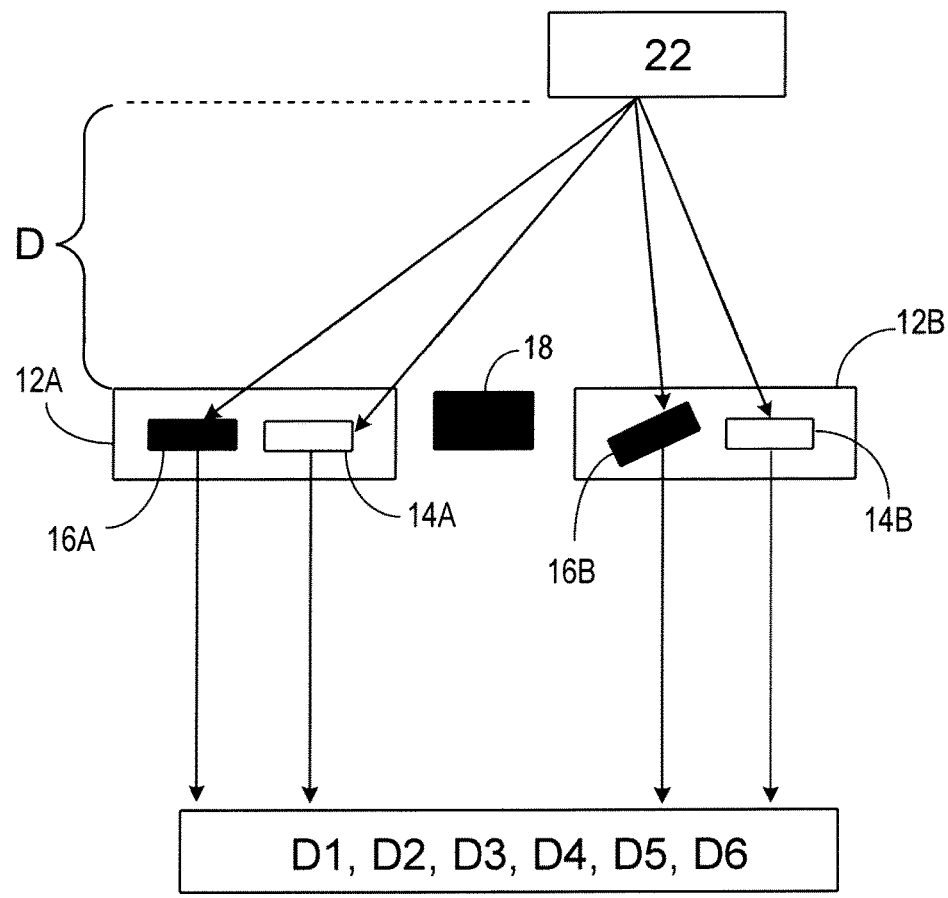
FIG. 10 illustrates a third calibration example.

FIG. 10 illustrates a third calibration example, which shows that one of the imagers 16B in the sub-array 12B is misaligned. As in the previous examples, the processor 20 can use known stereo-matching techniques used to determine respective distance values from the imagers to the object 22. Thus, a respective distance value (D1, D2, D3, D4, D5 or D6) is obtained for each of six imager pairs (i.e., 14A and 16A; 14B and 16B; 14A and 14B; 14A and 16B; 16A and 14B; 16A and 16B), and the distance values are compared so as to identify any imagers that may be misaligned. In this example, it is assumed the processor 20 determines that the intra-array distance D1 (corresponding to the imager pair 14A, 16A) is different from the intra-distance D2 (corresponding to the imager pair 14B, 16B). Based on this information, the processor 20 determines that an intra-array misalignment has occurred.

If the processor 20 determines that any of the distance values D3, D4, D5, D6 equals either D1 or D2, then the processor concludes that the imager combinations corresponding to values D3, D4, D5 and/or D6 that have a value equal to D1 or D2 do not contain the misaligned imager. For example, if D1≠D2 and D5=D3=D1, then the processor 20 concludes that the imagers 14A, 14B and 16A are not misaligned because collectively the values D5 and D3 are based on images from these imagers. Assuming further that the remaining distance values D4 and D6 have a value that differs from both D1 and D2, then the processor 20 concludes that the imager 16B is the misaligned imager. The processor 20 also can determine that the distances D1=D3=D5 represent the accurate distance to the object 22, because each of these distance values is based on images from the aligned imagers 14A, 14B and 16A. The processor 20 can apply correction factors to the misaligned imager (i.e., 16B in the example) to compensate for the misalignment.

Figure 11:
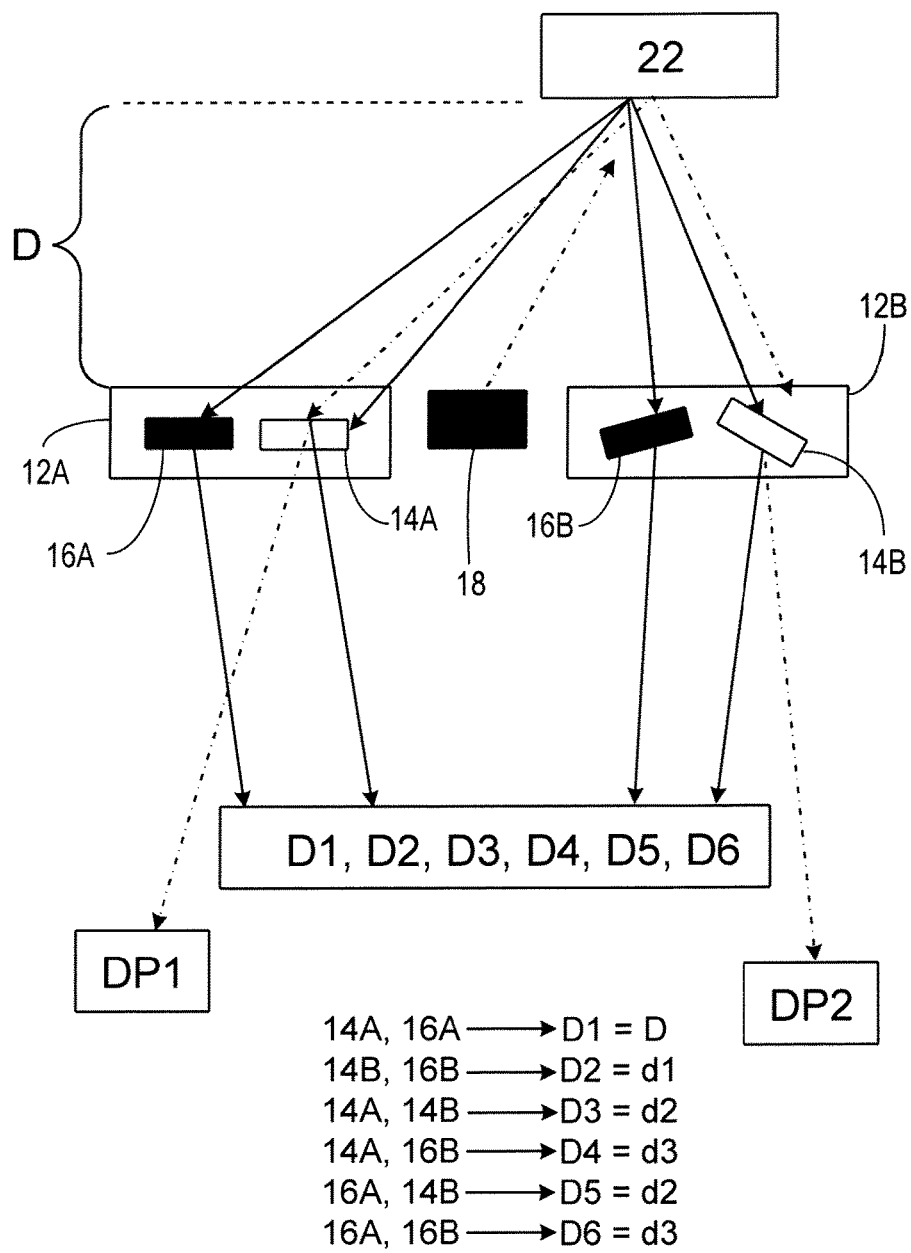
FIG. 11 illustrates a fourth calibration example.

FIG. 11 illustrates a fourth calibration example, which shows that both imagers 14B, 16B in the sub-array 12B are misaligned, and are misaligned with respect to one other. As in the previous examples, the processor 20 can use known stereo-matching techniques used to determine respective distance values from the imagers to the object 22. Thus, a respective distance value (D1, D2, D3, D4, D5 or D6) is obtained for each of six imager pairs (i.e., 14A and 16A; 14B and 16B; 14A and 14B; 14A and 16B; 16A and 14B; 16A and 16B), and the distance values are compared so as to identify any imagers that may be misaligned. In this example, it is assumed that the processor 20 determines that D3=D5 and D4=D6, but that none of D3 through D6 equals either D1 or D2. Based on this information, the processor 20 determines that two imagers on the same sub-array 12A or 12B (i.e., either imagers 14A and 16A, or imagers 14B and 16B) are misaligned.

To determine which of the sub-arrays 12 contains the misaligned imagers, a structured-light pattern is projected onto the object 22 from the light projection unit 18. Light from the projection unit 18 is shown in FIG. 11 (and subsequent figures) in dashed-dotted lines. The processor 20 then acquires images of the projected pattern using the respective IR-sensitive imagers 14A and 14B and compares each of the acquired patterns to a stored reference pattern. The processor 20 correlates differences between the acquired patterns with calculated distance values DP1 and DP2, each of which represents a calculated distance between the object 22 and a respective one of the IR-sensitive imagers 14A, 14B based on images detected when a pattern from the light projection unit 18 is projected on the object 22. Thus, in the illustrated example, DP1 represents the calculated distance between the object 22 and the IR-sensitive imager 14A, whereas DP2 represents the calculated distance between the object 22 and the IR-sensitive imager 14B. Assuming, for example, that the distance value DP1=D1, but that the distance value DP2≠D2, the processor 20 determines that the imagers 14B, 16B in the sub-array 12B are misaligned. Further, the processor 20 determines that the distance value DP1 represents the accurate distance D to the object 22. The processor 20 then can apply correction factors to compensate for the misalignment in the imagers 14B and 16B.

Figure 12:
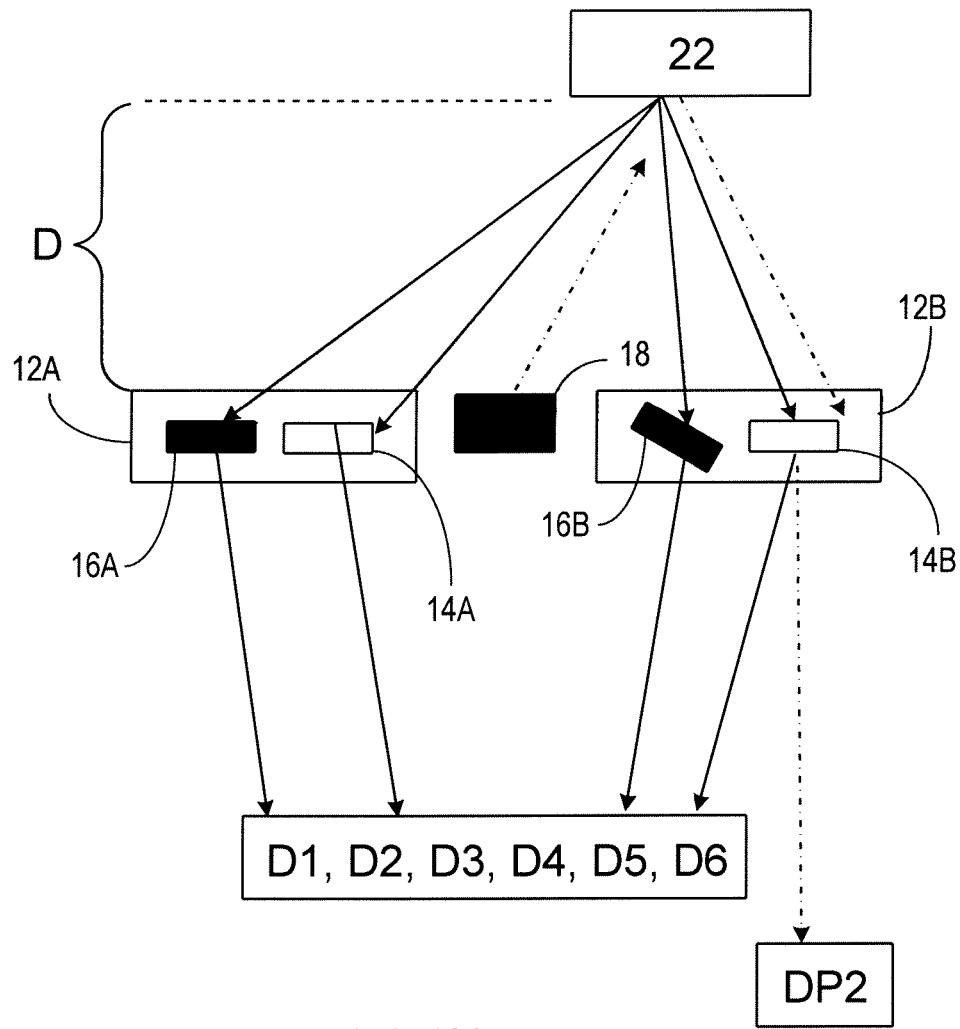
FIG. 12 illustrates a fifth calibration example.

FIG. 12 illustrates a fifth calibration example, which shows that one of the imagers 16B in the sub-array 12B is misaligned. This example is similar to the example of FIG. 10 in which the processor 20 concludes that the imager 16B is misaligned and that the distances D1=D3=D5 represent the accurate distance to the object 22. The processor 20 can apply correction factors to the misaligned imager (i.e., 16B in the example) to compensate for the misalignment. However, in the example of FIG. 12, additional correction factors can be obtained to improve the accuracy of the alignment as described next. To obtain the additional correction factors, a structured-light pattern can be generated by the pattern-projection unit 18. The processor 20 then acquires an image of the projected pattern using the IR-sensitive imager 14B, compares the collected pattern to a stored reference pattern and correlates differences between the pattern with the distance DP2, which DP2 represents the calculated distance between the object 22 and the IR-sensitive imager 16B. In this example, it is assumed that D2≠DP2. Thus, the processor 20 determines that the imagers 14B and 16B are misaligned with respect to each other. The distance value DP2 is deemed to represent the accurate distance to the object 22. The processor 20 then can apply correction factors such that D2 equals DP2.

In some implementations, it can be beneficial to acquire images from imagers in three or more different sub-arrays. The following techniques, which use at least three imagers, can be used in conjunction with any of the foregoing examples.

Figure 13:
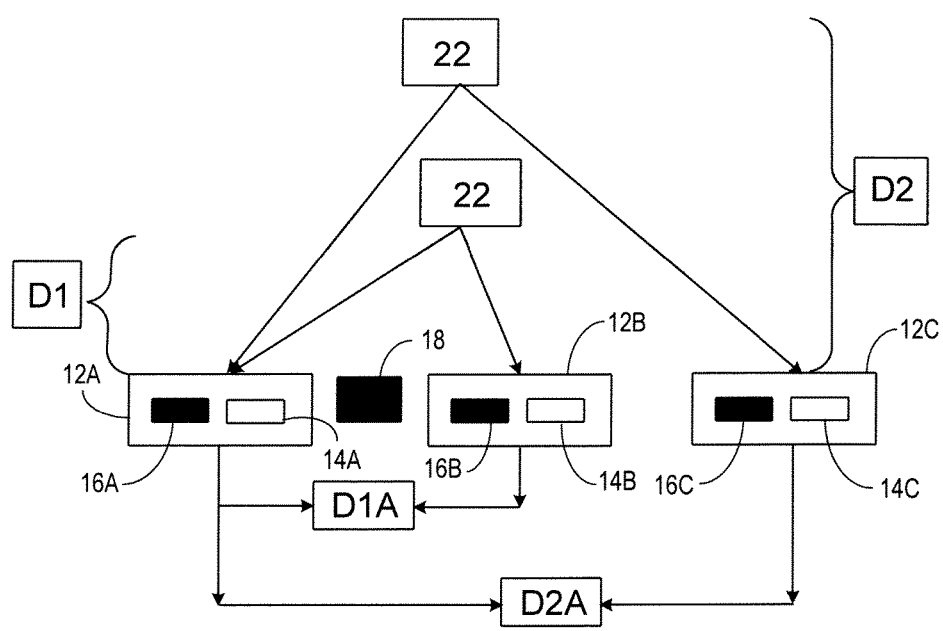
FIG. 13 illustrates a first example of an imaging assembly that includes more than two imager sub-arrays.

FIG. 13 illustrates a first example, which can be useful, for example, where one object is occluded by another object in the scene. FIG. 13 illustrates three sub-arrays 12A, 12B, 12C, each of which includes a respective IR-sensitive imager 14A, 14B, 14C and a respective RGB-sensitive imager 16A, 16B, 16C. As before, after determining the scene lighting/texture conditions or requirement, images are acquired from three or more imagers in three or more sub-arrays 12A, 12B, 12C. The scene conditions dictate which type of imager(s) should be used (e.g., IR-sensitive and/or RGB) and whether the images should be acquired with or without a projected IR pattern from the light projection unit 18. After acquiring the images, the processor 20 matches corresponding pixels in the images from sub-groups of the sub-arrays. For example, based on the scene requirements, as indicated by FIG. 13, the processor 20 can match images from a first sub-group of sub-arrays 12A, 12B to obtain a first distance value D1A, and can match images from a second sub-group of sub-arrays 12A, 12C to obtain a second distance value D2A. In particular, pixels can be identified using native features or projected-pattern features, depending on scene requirements. The processor 20 then identifies disparities in the matched pixel position. For example the processor 20 can identify disparities in pixels matched from images collected by sub-arrays 12A and 12B for a first object 22A, and disparities in pixels matched from images collected by sub-arrays 12A and 12C for a second object 22B. The processor 20 then correlates the disparities for sub-arrays 12A and 12C with a calculated distance value D2 to the second object 22B, and correlates the disparities for sub-arrays 12A and 12B with a calculated distance value D1 to the first object 22A. Based on the foregoing information, the processor 20 can generate a depth map, which can include the partially occluded second object 22B as well as the first object 22A. In some cases, the processor 20 also may generate a final three-dimensional image based on the foregoing information.

Figure 14:
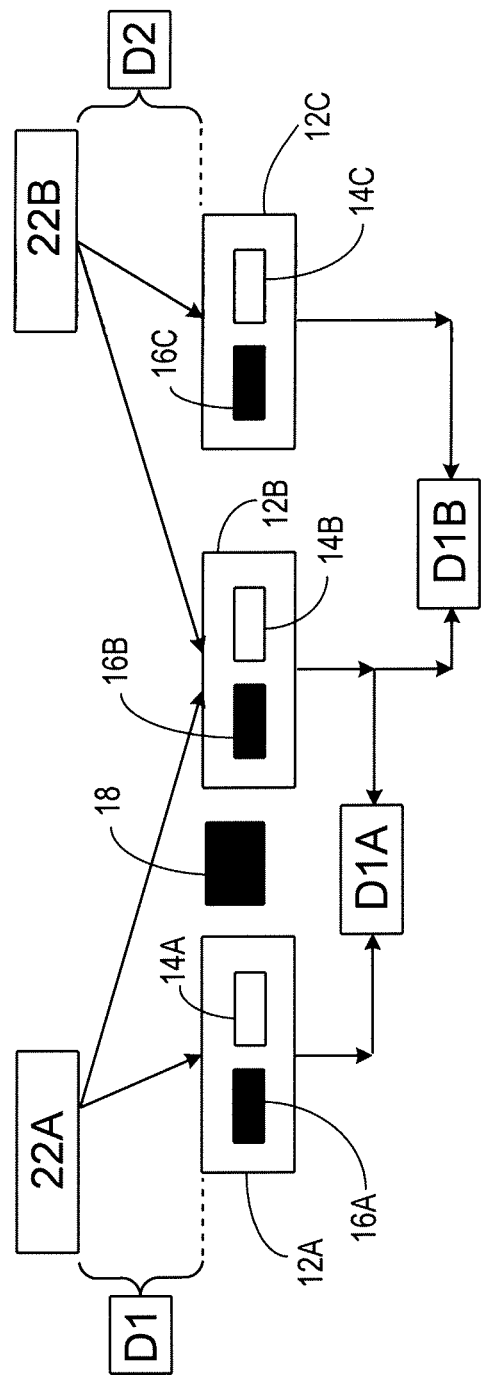
FIG. 14 illustrates a second example of an imaging assembly that includes more than two imager sub-arrays.

FIG. 14 illustrates a second example, which can be useful where an object (e.g., 22A or 22B) is outside of the field-of-view of one or more sub-arrays. By including three or more sub-arrays, the effective field-of-view of the imaging assembly 10 can be expanded. After determining the scene lighting/texture conditions or requirements, the processor 20 can acquire images from three or more sub-arrays 12A, 12B, 12C, and matches the images using either native features or features based on projected IR patterns from the light projection unit 18. For example, the processor 20 can match images from a first sub-group of sub-arrays 12A, 12B to obtain a first distance value D1A, and from a second sub-group of sub-arrays 12B, 12C to obtain a second distance value D1B. The processor 20 then identifies disparities in the pixel positions and correlates the disparities with depth. Based on the foregoing information, the processor 20 can generate a depth map, as well as a final three-dimensional image.

Figure 15:
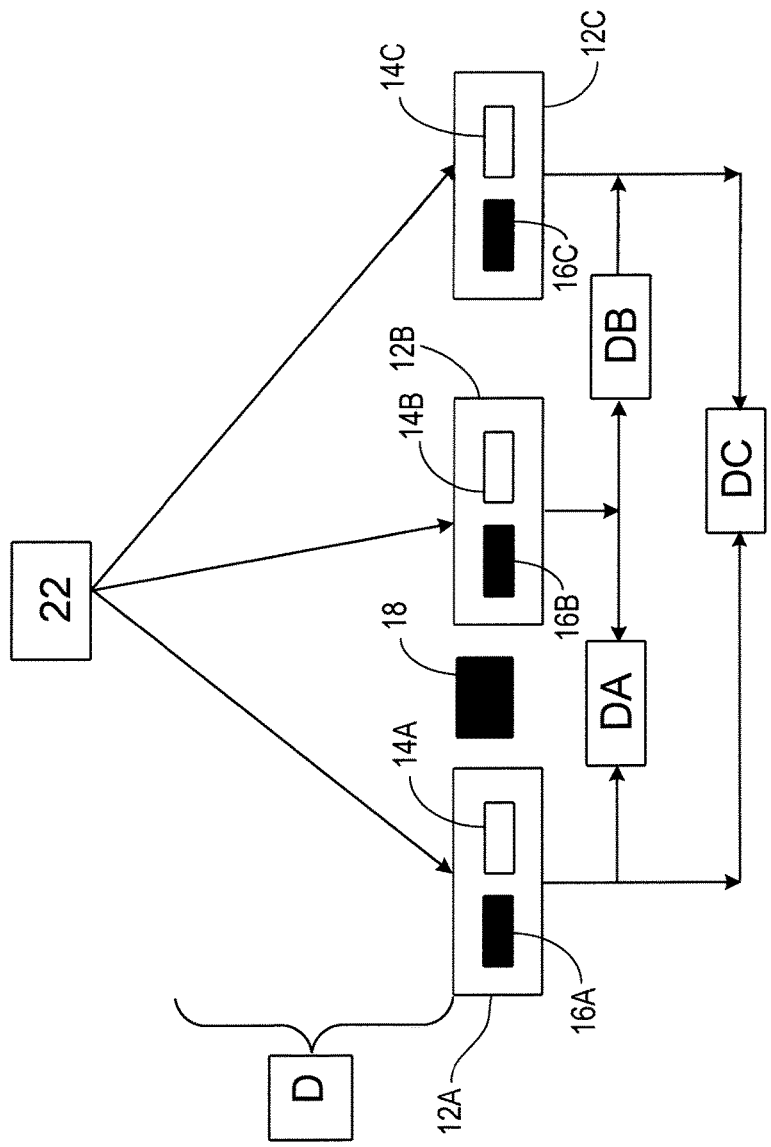
FIG. 15 illustrates a third example of an imaging assembly that includes more than two imager sub-arrays.

FIG. 15 illustrates a third example, which can be useful to provide increased accuracy of the depth information. After determining the scene lighting/texture conditions or requirements, the processor 20 acquires images from three or more sub-arrays 12A, 12B, 12C, and matches the images using either native features or features based on projected IR patterns from the light projection unit 18. For example, the processor 20 can match images from a first sub-group of sub-arrays 12A, 12B to obtain a first distance value D1A, from a second sub-group of sub-arrays 12B, 12C to obtain a second distance value D1B, and from a third sub-group of sub-arrays 12A, 12C to obtain a third distance value D1C. The processor 20 then identifies disparities in the matched pixel positions and correlates the disparities with depth. Based on the foregoing information, the processor 20 can generate a depth map, as well as a final three-dimensional image.

Figure 16:
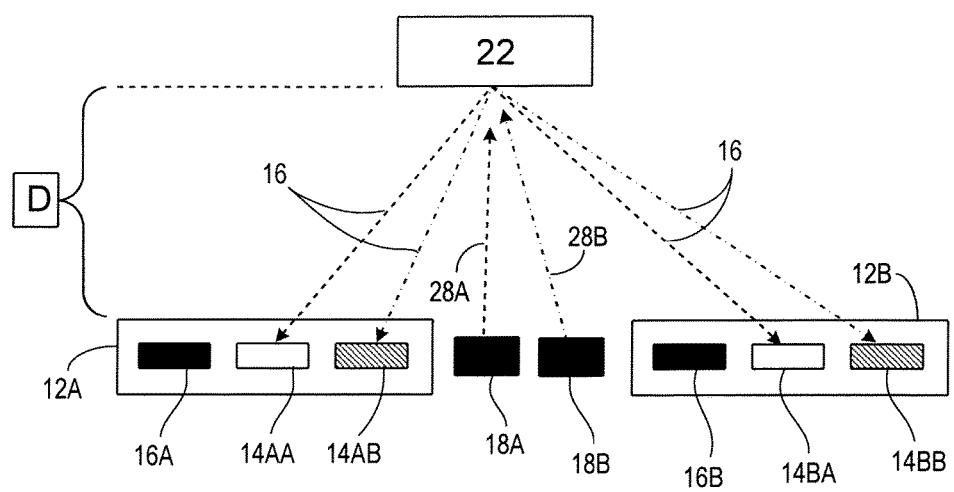
FIG. 16 illustrates a first example of an imaging assembly that includes imagers to sense different portions of the IR spectrum.

In some implementations, it can be beneficial to provide multiple IR-sensitive imagers in each sub-array, where each IR-sensitive imager in a particular sub-array is sensitive to a different portion of the near-IR spectrum. An example is illustrated in FIG. 16, which shows two sub-arrays 12A, 12B each of which includes a RGB-sensitive imager and two different IR-sensitive imagers. In particular, the sub-array 12A includes a RGB-sensitive imager 16A, as well as a first IR-sensitive imager 14AA that is sensitive only to a first portion of the near-IR spectrum, and a second IR-sensitive imager 14AB that is sensitive only to a second, different portion of the near-IR spectrum. Likewise, the sub-array 12B includes a RGB-sensitive imager 16B, as well as a first IR-sensitive imager 14BA that is sensitive to the first portion of the near-IR spectrum, and a second IR-sensitive imager 14BB that is sensitive to the second portion of the near-IR spectrum. Bandpass filters can be provided so that the IR-sensitive imagers are sensitive to the desired wavelengths. The illustrated assembly of FIG. 16 also includes two light projection units 18A, 18B, which can illuminate an object 22 with different respective portions of the IR spectrum. Thus, for example, the first light projection unit 18A can provide illumination 28A in the first portion of the near-IR spectrum, whereas the second light projection unit 18B can provide illumination 28B in the second portion of the near-IR spectrum.

Figure 17:
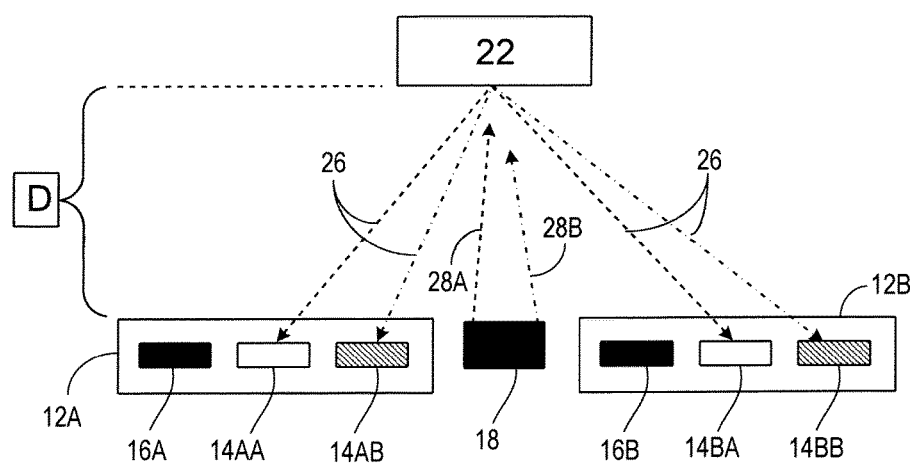
FIG. 17 illustrates a second example of an imaging assembly that includes imagers to sense different portions of the IR spectrum.

FIG. 17 illustrates a configuration similar to that of FIG. 16. However, instead of two different light projection units 18A, 18B that illuminate an object 22 with different respective portions of the IR spectrum, the configuration of FIG. 17 uses a single light projection unit 18 that is operable to illuminate the object 22 with two different portions of the IR spectrum simultaneously.

Using the assembly of FIG. 16 or 17, the processor 20 can acquire images from the sub-arrays 12A, 12B and match the images. The processor 20 then can identify disparities in the pixel positions and correlate the disparities with depth. Using images from multiple IR-sensitive imagers having different characteristics can improve the precision of the depth information by increasing the overall resolution of the imagers. Based on the foregoing information, the processor 20 can generate a depth map, as well as a final three-dimensional image.

Figure 18:
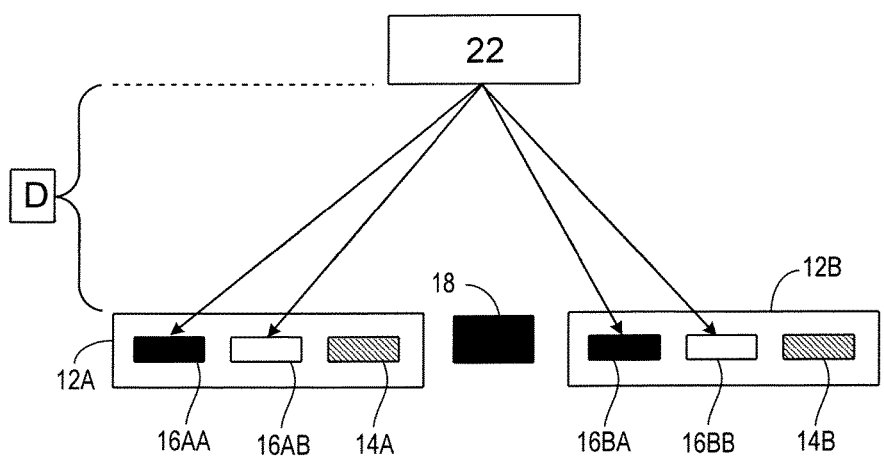
FIG. 18 illustrates an example of an imaging assembly that includes different types of RGB imagers.

In some implementations, it can beneficial to provide multiple RGB-sensitive imagers in each sub-array, where at least one of the RGB-sensitive imagers in each particular sub-array includes a neutral density filter. An example is illustrated in FIG. 18, which shows two sub-arrays 12A, 12B each of which includes a first RGB-sensitive imager, a second RGB-sensitive imager with a neutral density filter, and an IR-sensitive imager. In particular, the first sub-array 12A includes a first RGB-sensitive imager 16AA, a second RGB-sensitive imager 16AB with a neutral density filter, and an IR-sensitive imager 14A. The second sub-array 12B includes a first RGB-sensitive imager 16BA, a second RGB-sensitive imager 16BB with a neutral density filter, and an IR-sensitive imager 14B. In this example, the second RGB-sensitive imagers 16AA, and 16BA do not include a neutral density filter.

The imaging assembly of FIG. 18 can be useful, for example, for RGB stereo image collection in high-dynamic range (HDR) imaging. After determining the scene lighting/texture conditions or requirements, the processor 20 can acquire images from two (or more) RGB-sensitive imagers 16AA, 16BA in the different sub-arrays and can match the corresponding pixels in the acquired images, for example, using native features. The processor 20 also can acquire images from two (or more) RGB-sensitive imagers 16AB, 16BB that include the neutral-density filters and can match the corresponding pixels in these RGB images, using for example, the native features. The various matching steps may take sequentially or in parallel. The processor 20 then identifies disparities in the pixel position in the matched RGB images, and uses the identified disparities to blend the RGB images to obtain a 3D HDR image. In some cases, the IR channels may be used to generate depth/distance information, or to increase the accuracy of the depth/distance information derived from the RGB images.

As described above, the stereo imaging assembly 10 can include a light source (e.g., that is part of a pattern projection unit 18) for projecting a pattern onto an object in a scene. In some instances, the light source can be implemented as a laser diode that emits a predetermined narrow range of wavelengths in the IR part of the spectrum. For example, the laser diode in some cases may emit light in the range of about 850 nm±10 nm, or in the range of about 830 nm±10 nm, or in the range of about 940 nm±10 nm. Different wavelengths and ranges may be appropriate for other implementations depending, for example, on the availability of particular laser diodes. Structured light emitted by the laser diode may be reflected, for example, by an object in a scene such that the reflected light is directed toward the image sub-arrays 12A, 12B.

In some cases, each IR imager (e.g., 14A, 14B) includes a band-pass filter designed to filter substantially all IR light except for IR light emitted by the laser diode. The band-pass filter preferably permits passage of a slightly wider range of wavelengths than is emitted by the laser diode. Further, the wider wavelength range that the band-pass filter allows to pass should be centered at slightly longer wavelengths relative to the narrow range of wavelength emitted by the laser diode. This latter feature is inherent, for example, in dielectric-type band-pass filters, where the peak (passed) wavelength shifts to shorter wavelengths as the angle of incidence of impinging light increases. On the other hand, each of the visible-light imagers (e.g., 16A, 16B) can include an IR-cut filter designed to filter substantially all IR light such that almost no IR light reaches the photosensitive region of the visible-light imagers. Thus, the IR-cut filter preferably allows only visible light to pass.

The foregoing features, which can be applied to any of the various implementations described above, can allow the same IR imager (e.g., 14A or 14B) to collect projected IR structured light as well as visible light without IR-washout. The IR imagers can be used, for example, to collect stereo images in various scenarios. For example, in some implementations, the IR imagers can collect patterned or textured IR light that has been projected onto an object or scene (i.e., light projected by a laser diode). In other implementations, the IR imagers in conjunction with the projected textured or patterned light can be used under ambient light conditions (e.g., outside, where there is a significant amount of natural sunlight including IR radiation). In some implementations, a visible-light imager (e.g., 16A or 16B) with an IR-cut filter and a single IR imager (e.g., 14A or 14B) with a band-pass filter can be used to acquire depth information. In some instances, the optical intensity output by the laser diode can be modulated to facilitate serial image capture using different amounts of projected power. For example, low power projected light may be used for closer objects, whereas high power projected light may be used for more distant objects. These features can, in some cases, improve pattern or texture resolution, and also may reduce power. In some implementations, instead of obtaining serial images as the laser diode is modulated between two different non-zero power modes, serial images can be obtained as the laser diode is switched between an ON mode and an OFF mode.

In the context of the present disclosure, the term "light" can include radiation in the visible portion of the spectrum as well as radiation in the IR (including near-IR or far-IR) or UV (including near-UV or far-UV) portions of the spectrum. Light in the visible region may be, for example, monochrome or RGB.

The imaging assemblies described above can be integrated into a wide range of mobile or portable devices, such as cellular phones, smart phones, personal digital assistants (PDAs), digital cameras, portable game consoles, portable multimedia players, handheld e-books, portable tables, and laptops, among others.

Various modifications can be made to the foregoing examples within the spirit of the invention. Accordingly, other implementations are within the scope of the claims.

What is claimed is:

1. An apparatus comprising:
an imaging assembly including:
a plurality of imager sub-arrays, each of which includes a first imager to sense light of a first wavelength or range of wavelengths and a second imager to sense light of a different second wavelength or range of wavelengths, wherein each of the first and second imagers has its own respective one or more dedicated beam shaping elements; and
a pattern projection unit to project a light pattern onto an object; and
one or more processors operable collectively to receive and process signals from the first and second imagers in each imager sub-array,
wherein the one or more processors are operable collectively to obtain, from the imager sub-arrays, signals that collectively allow the one or more processors to generate one or more of the following: (i) a stereo image based on images acquired from the first imagers, (ii) a stereo IR image based on images acquired from the second imagers, (iii) a stereo image based on images acquired in response to the light pattern projected by the pattern projection unit, or (iv) a non-stereo image based on images acquired in response to the light pattern projected by the pattern projection unit,
wherein the one or more processors are operable collectively to obtain intra-array and inter-array depth information based on signals from the imager sub-arrays, to compare the intra-array depth information to inter-array depth information, to determine whether one of the imager sub-arrays is misaligned based on the comparison and, if so, to determine whether misalignment is intra-array or inter-array,
wherein the intra-array information is based on pixel data from one of the first imagers and one of the second imagers in a same imager sub-array as one another, and wherein the inter-array information is based on pixel data from respective ones of the first and/or second imagers in different imager sub-arrays from one another.

2. The apparatus of claim 1 wherein the one or more processors are operable collectively to correct for intra-array misalignment.

3. The apparatus of claim 1 wherein the one or more processors are operable collectively to correct for inter-array misalignment.

4. The apparatus of claim 1 wherein the intra-array information comprises stereoscopically matched pixels from one of the first imagers and one of the second imagers in the same imager sub-array.

5. The apparatus of claim 1 wherein each first imager is operable to sense radiation in a visible part of the spectrum, and each second imager is operable to sense radiation in an IR part of the spectrum.

6. The apparatus of claim 1 wherein the one or more processors are operable to generate each of (i), (ii), (iii) and (iv).

7. The apparatus of claim 1 wherein the pattern projection unit is operable to project an IR pattern onto a scene, and wherein the one or more processors are operable collectively to:
match corresponding pixels in IR images acquired from the imager sub-arrays,
identify disparities in positions of the matched pixels, and correlate the disparities with depth.

8. The apparatus of claim 1 wherein the pattern projection unit is operable to project an IR pattern onto a scene, and wherein the one or more processors are operable collectively to:
match corresponding IR-sensitive pixels in images acquired from different ones of the imager sub-arrays, identify first disparities in positions of the matched IR-sensitive pixels, and correlate the first disparities with depth to obtain first depth information, and
match corresponding RGB-sensitive pixels in images acquired from different ones of the imager sub-arrays, identify second disparities in positions of the matched RGB-sensitive pixels, and correlate the second disparities with depth to obtain second depth information.

9. The apparatus of claim 8 wherein the one or more processors are further operable collectively to:
compare the first and second depth information derived, and determine to which regions of an image representing the scene the respective depth information should be applied.

10. The apparatus of claim 8 wherein the one or more processors are further operable collectively to:
construct a depth map including depth information derived at least in part from the first and second depth information.

11. The apparatus of claim 1 wherein the one or more processors are operable collectively to:
match corresponding pixels in RGB images acquired from different ones of the imager sub-arrays,
identify disparities in positions of the matched pixels, and correlate the disparities with depth.

12. The apparatus of claim 1 wherein the one or more processors are operable collectively to:
match corresponding RGBIR-sensitive pixels in images acquired from different ones of the imager sub-arrays, identify first disparities in positions of the matched RGBIR-sensitive pixels, and correlate the first disparities with depth to obtain first depth information, and
match corresponding RGB-sensitive pixels in images acquired from different ones of the imager sub-arrays, identify second disparities in positions of the matched RGB-sensitive pixels, and correlate the second disparities with depth to obtain second depth information.

13. The apparatus of claim 12 wherein the one or more processors are further operable collectively to:
compare the first and second depth information derived, and determine to which regions of an image representing a scene the respective depth information should be applied.

* * * * *